United States Patent
Sotome (10) Patent No.: US 10,300,862 B2
(45) Date of Patent: May 28, 2019

(54) HOLDING DEVICE

(71) Applicant: PIOLAX, INC., Yokohama-shi (JP)

(72) Inventor: Yukihiro Sotome, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/950,941

(22) Filed: Apr. 11, 2018

(65) Prior Publication Data

US 2018/0297532 A1  Oct. 18, 2018

(30) Foreign Application Priority Data

Apr. 18, 2017 (JP) ................................ 2017-082395

(51) Int. Cl.
  *B60R 7/02* (2006.01)
  *F16B 45/02* (2006.01)

(52) U.S. Cl.
  CPC ................ *B60R 7/02* (2013.01); *F16B 45/02* (2013.01)

(58) Field of Classification Search
  CPC ..... B60R 7/02; B60R 7/10; B60R 7/08; F16B 45/02; F16B 13/00; F16B 45/00; F16B 45/025; A47F 5/0815; A47G 29/00; A47C 7/62; A47C 7/64
  USPC .............. 248/222.52, 304, 322, 339, 223.31, 248/225.21, 220.22, 220.21, 220.31, 248/220.42, 220.41, 224.8; 224/313, 927, 224/482
  See application file for complete search history.

(56) References Cited

U.S. PATENT DOCUMENTS

| 2,987,286 A * | 6/1961 | Alling ...................... G09F 1/10 248/220.31 |
| 3,385,547 A * | 5/1968 | West ........................ B60R 7/10 211/99 |
| 8,240,625 B2 * | 8/2012 | Kato ........................ B60R 7/10 248/224.7 |

(Continued)

FOREIGN PATENT DOCUMENTS

| CN | 205615423 U | 10/2016 |
| JP | H 04-074150 U1 | 6/1992 |

(Continued)

OTHER PUBLICATIONS

GB Search Report, dated Oct. 9, 2018, in corresponding British Application No. GB1805957 6.

*Primary Examiner* — Christopher Garft
(74) *Attorney, Agent, or Firm* — McGinn I.P. Law Group, PLLC.

(57) ABSTRACT

There is provided a holding device mounted in a mounting hole in a mount member to hold a predetermined member. A base member is mounted in the mounting hole. A bag hooking member is supported rotatably on the base member. The bag hooking member has a holding portion that takes, depending on its rotational positions, a protruding state and a stowed state and that holds the predetermined member in the protruding state. The base member has a frame portion surrounding the bag hooking member, a claw portion extending from one side of the frame portion to be locked on a rear side portion of the mount member, and an erect portion erected from the one side of the frame portion to be locked on the rear side portion in a position lying nearer to the mounting hole than a distal end of the claw portion.

15 Claims, 9 Drawing Sheets

(56) References Cited

U.S. PATENT DOCUMENTS

2017/0265666 A1* 9/2017 Sotome ................... B60R 7/10

FOREIGN PATENT DOCUMENTS

| JP | 2003-325267 A | 11/2003 |
| KR | 10-0845126 B1 | 7/2008 |
| WO | WO 2014/199768 A1 | 12/2014 |
| WO | WO 2017/094575 A1 | 6/2017 |

* cited by examiner

HOLDING DEVICE

CROSS-REFERENCE TO RELATED APPLICATIONS

The disclosure of Japanese Patent Application No. 2017-082395 filed on Apr. 18, 2017, including specification, drawings and claims is incorporated herein by reference in its entirety.

TECHNICAL FIELD

The present disclosure relates to a holding device that includes a rotatable bag hooking member.

BACKGROUND

A hook device provided in a passenger compartment of a vehicle is used to hook a rope or the like (refer to Patent Document 1). A hook device described in Patent Document 1 is made up of a frame-shaped base member that is mounted in a mounting hole and a hook member that is supported rotatably on the base member.

The base member described in Patent Document 1 has a rectangularly annular flange portion, a circumferential wall that projects from the flange portion, a hooking piece that extends into an arc-like shape from an upper side of the circumferential wall, and an engaging piece that extends from a lower side of the circumferential wall. This base member is mounted in a mounting hole by the flange portion being locked on a front side edge of the mounting hole and the hooking piece and the engaging piece being locked on a rear side edge of the mounting hole.

Patent Document 1: International Paten Application Publication No. WO 2014/199768A When a rope or the like is hooked on the hook member described in Patent Document 1, a rotational moment is generated by a load exerted from the rope or the like, causing the hook member to push an upper portion side of the base member from a rear side in a direction that is at right angles to a surface of the base member. This rotational moment causes fears that the hooking piece that is situated on an upper side of the base member receives a reaction force from a mount member to thereby deflect to be deformed as time goes on, leading to the possibility that the hook device rattles against the mount member.

SUMMARY

It is therefore at least one of the objects of the present disclosure to provide a holding device that suppresses the generation of rattling against a mount member that would be caused by deformation with time.

With a view to solving the problem, according to an aspect of the embodiments of the disclosure, there is provided a holding device mounted in a mounting hole in a mount member and configured to hold a predetermined member, including a base member configured to be mounted in the mounting hole and a bag hooking member that is supported rotatably on the base member. The bag hooking member has a holding portion that takes, depending on its rotational positions, a protruding state where the holding portion protrudes to a front side and a stowed state where the holding portion is stowed in on a rear side of the base member and that holds the predetermined member in the protruding state. The base member has a frame portion configured to surround the bag hooking member, a claw portion that extends from one side of the frame portion to be locked on a rear side portion of the mount member, and an erect portion that is erected from the one side of the frame portion to be locked on the rear side portion of the mount member in a position lying nearer to the mounting hole than a distal end of the claw portion.

According to another aspect of the embodiments of the disclosure, there is also provided a holding device. This holding device includes a base member configured to be mounted in a mounting hole and a bag hooking member that is supported rotatably on the base member. The bag hooking member has a holding portion that takes, depending on its rotational positions, a protruding state where the holding portion protrudes to a front side and a stowed state where the holding portion is stowed in on a rear side of the base member and that holds a predetermined member in the protruding state. The base member has a frame portion configured to surround the bag hooking member and a claw portion that extends from the frame portion to be locked on a rear side portion of a mount member. The bag holding member pushes the claw portion against the rear side portion of the mount member by virtue of a rotational moment of the bag hooking member that is generated when the predetermined member is held on the holding portion.

According to the disclosure, it is possible to provide the holding device that suppresses the generation of rattling against the mount member that would be otherwise caused by virtue of deformation with time.

DETAILED DESCRIPTION OF THE EMBODIMENTS

Figure 1A:
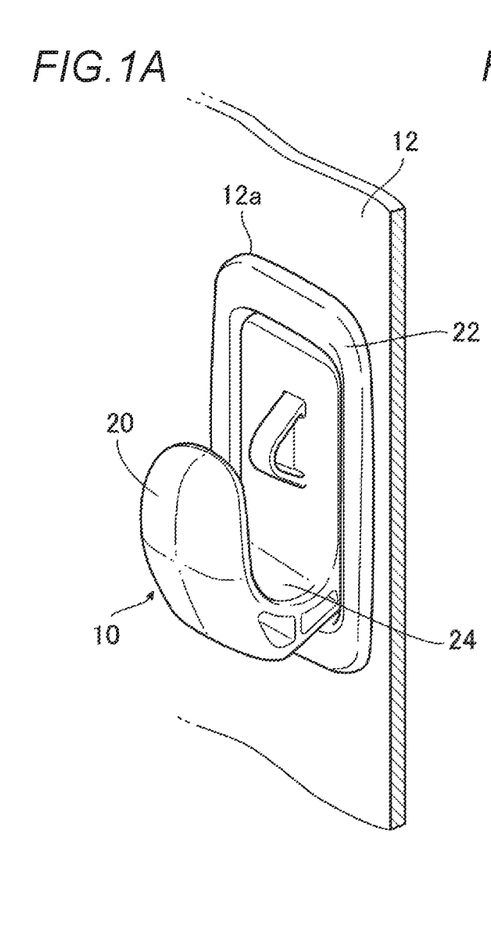
FIGS. 1A and 1B show perspective views of a holding device that is mounted in a mount member.
Figure 1B:
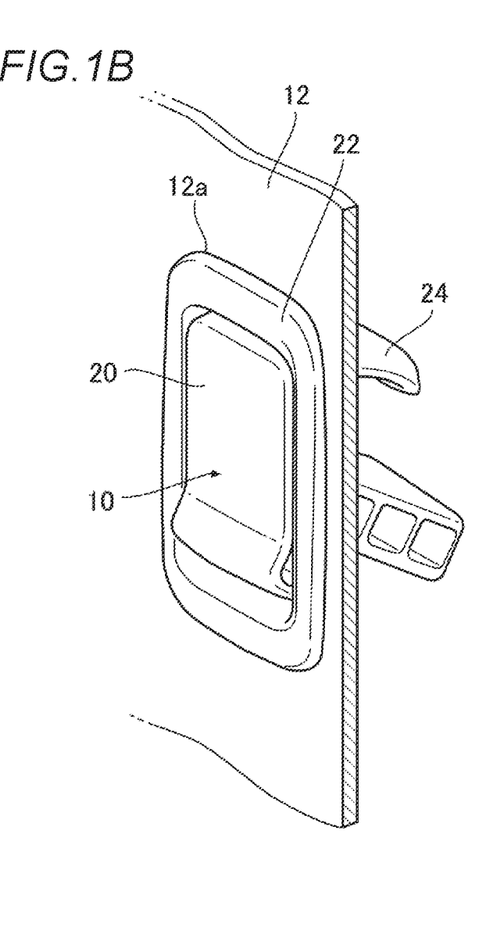

FIGS. 1A and 1B show perspective views of a holding device 10 that is mounted in a mount member 12. FIG. 1A shows a state where the holding device 10 is in use, and FIG. 1B shows a state where the holding device 10 is in non-use.

The holding device 10 is mounted so as to be embedded in a mount member 12 such as a back surface of a seat of a vehicle, an interior panel of a vehicle and a wall surface of a luggage compartment of a vehicle. The holding device 10 includes a base member 22 that is fixed in place in a mounting hole 12a in the mount member 12 and a bag hooking member 20 that is supported rotatably on the base member 22.

The holding device 10 takes a protruding state where a holding portion 24 of the bag hooking member 20 protrudes when the holding device 10 is in use as shown in FIG. 1A, while the holding device 10 takes a stowed state where the holding portion 24 of the bag hooking member 20 is stowed when the holding device 10 is in non-use as shown in FIG. 1B. In the protruding state, the holding portion 24 holds a predetermined member such as a handle of an umbrella or a cord handle of a bag. A rotation of the bag hooking member 20 from the stowed state to the protruding state is referred to as a rotation in an opening direction, and a rotation of the bag hooking member 20 from the protruding state to the stowed state is referred to as a rotation in a closing direction.

Figure 2:
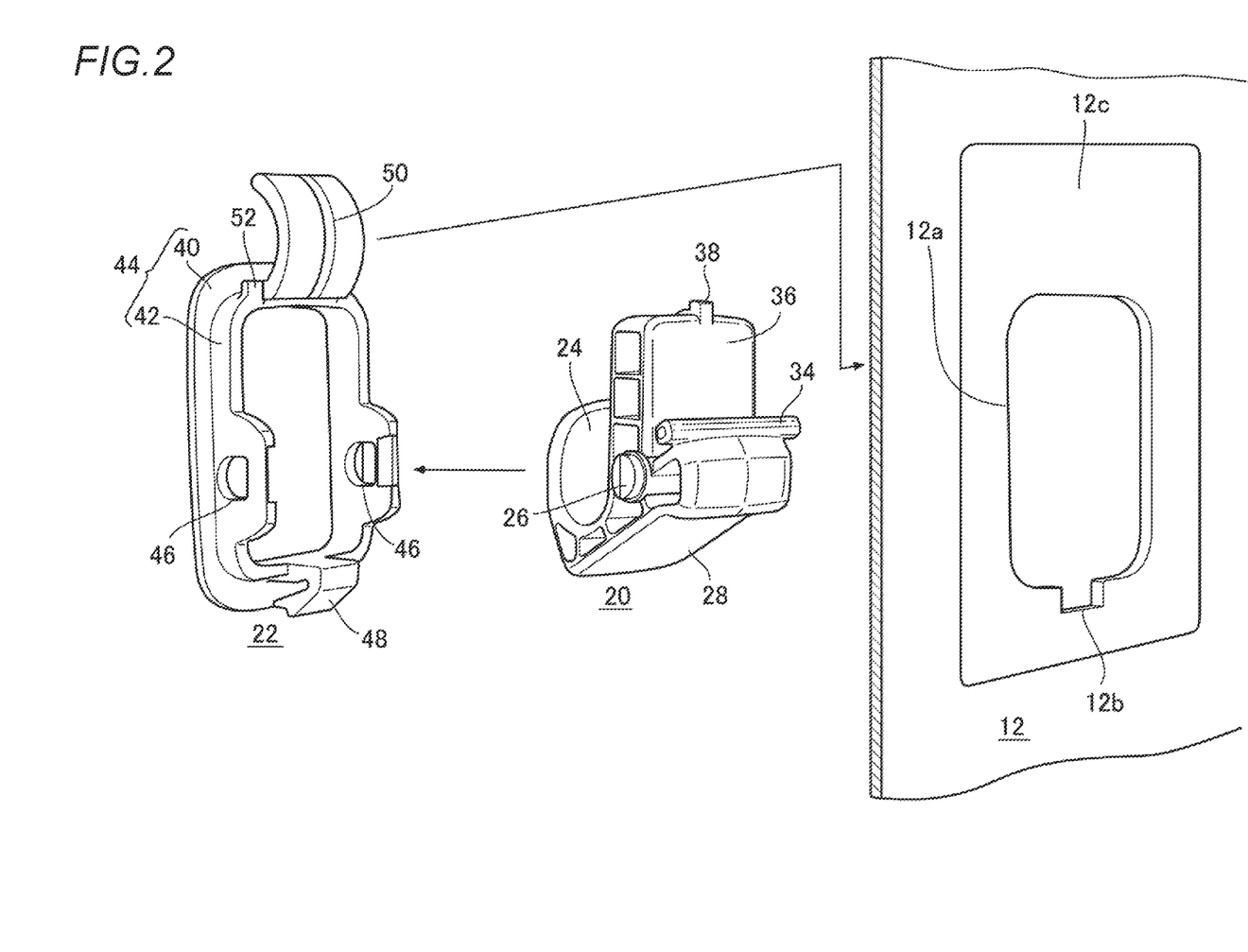
FIG. 2 is an exploded view of the holding device and the mount member.

FIG. 2 is an exploded view of the holding device 10 and the mount member 12. The mount member 12 has the mounting hole 12a in which the base member 22 is mounted, a locking recess portion 12b that is formed by causing a part of a lower end side of the mounting hole 12a to recede, and a rear side portion 12c that is situated above the mounting hole 12a on a rear side of the mount member 12. The bag hooking member 20 and the base member 22 will be described by reference to other drawings.

Figure 3A:
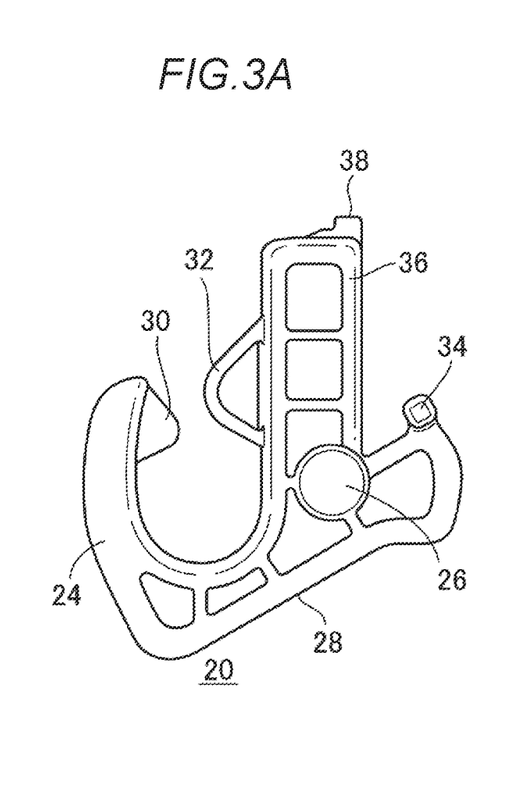
FIG. 3A is a side view of a bag hooking member.
Figure 3B:
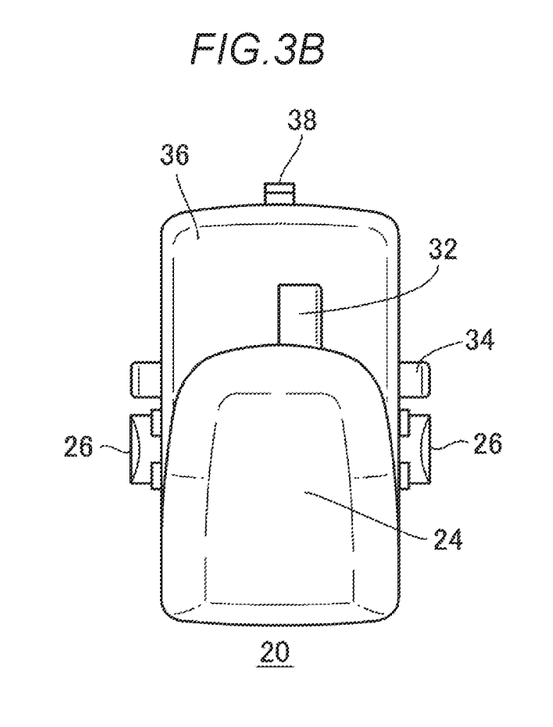
FIG. 3B is a front view of the bag hooking member.

FIG. 3A is a side view of the bag holding member 20, and FIG. 3B is a front view of the bag hooking member 20. The bag hooking member 20 has the holding portion 24, shaft portions 26, a closure portion 28, a first projection 30, a second projection 32, a rotation limiting portion 34, a base portion 36 and an abutment portion 38.

The pair of shaft portions 26 are formed individually at side portions of the prism-like base portion 36 so as to project therefrom. It should be noted that a direction that follows a rotational axis of the shaft portions 26 is referred to simply as an axial direction. The holding portion 24 is bent from the base portion 36 to protrude to a front side of the base portion 36 and is formed into a hook-like shape. The predetermined member is hooked on the holding portion 24 and is then held thereto. The first projection 30 is formed to project from the holding portion 24 towards the base portion 36, while the second projection 32 is formed to project from the base portion 36 towards the holding portion 24. The first projection 30 and the second projection 32 make it difficult for the predetermined member held to the holding portion 24 to be dislocated therefrom.

The closure portion 28 is formed to stretch from the holding portion 24 to the base portion 36 and constitutes a closing surface that closes the mounting hole 12a when the bag hooking member 20 is stowed. The rotation limiting portion 34 extends in the axial direction in a position that lies away from the shaft portions 26 and is brought into a wall portion 42 of the base member 22 to limit the rotation of the bag hooking member 20 when the bag hooking member 20 is rotated from the protruding state to the stowed state.

The abutment portion 38 projects from an end face of the base portion 36 in a direction that is at right angles to the axial direction and projects upwards from an upper end face of the base portion 36 in the protruding state. The abutment portion 38 is brought into abutment with a claw portion 50 of the base member 22 to restrict deformation of the claw portion 50.

Figure 4A:
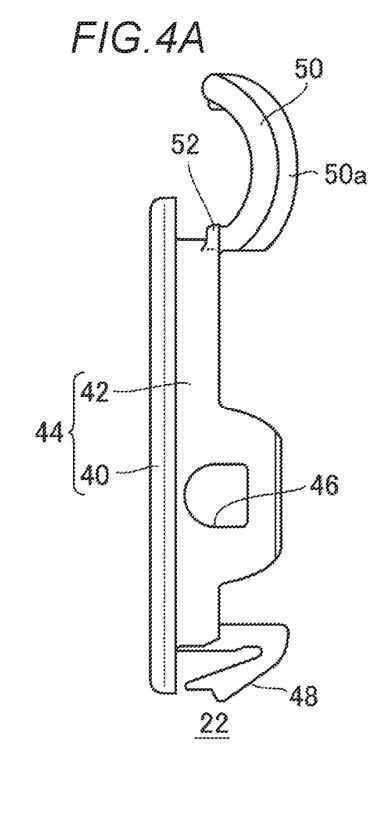
FIG. 4A is a side view of a base member.
Figure 4B:
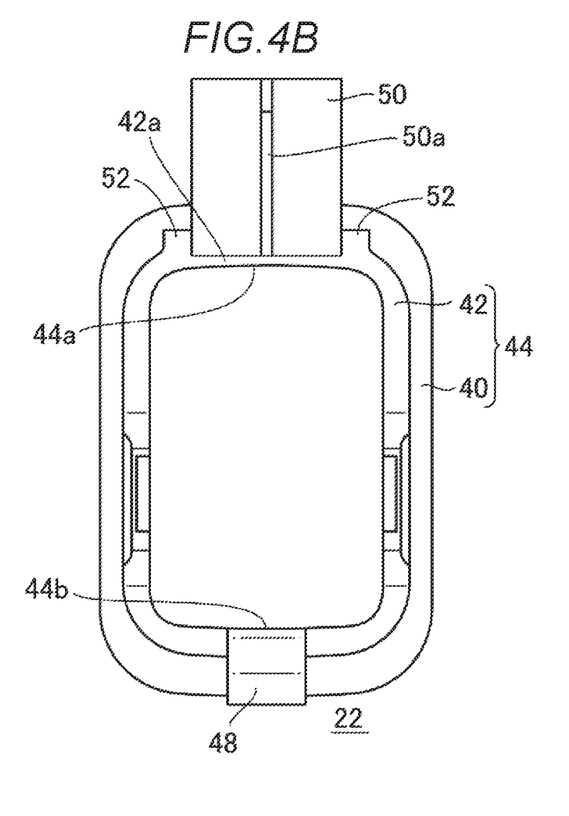
FIG. 4B is a rear view of the base member.

FIG. 4A is a side view of the base member 22, and FIG. 4B is a rear view of the base member 22. The base member 22 has a frame portion 44, shaft hole portions 46, an elastic locking portion 48, the claw portion 50 and an erect portion 52.

The frame member 44 is formed into a rectangular shape by a flange portion 40 and the wall portion 42 and surrounds the bag hooking member 20. The flange portion 40 is locked on a front edge of the mounting hole 12a when the flange portion 40 is mounted on the mount member 12 to thereby prevent the base member 22 from moving to a rear side of the mount member 12. The wall portion 42 is erected from an inner edge of the flange portion 40 and extends from a front side to the rear side of the mount hole 12a. An abutment surface 42a is formed on a first side 44a of the wall portion 42 so that the abutment portion 38 of the bag hooking member 20 is brought into abutment therewith.

The shaft hole portions 46 are formed individually in both sides of the wall portion 42 to support the corresponding shaft portions 26 of the bag hooking member 20 rotatably. While the shaft portions 26 and the shaft hole portions 46 are described as being provided on and in the bag hooking member 20 and the base member 22, respectively, the invention is not limited to the form described above, and hence, the shaft portions and the shaft hole portions may be provided the other way round. Namely, the shaft hole portions may be provided in the bag hooking member 20, while the shaft portions may be provided on the base member 22.

The claw portion 50 extends upwards from the first side 44a that is at an upper end side of the wall portion 42 and extends in a direction in which the claw portion 50 moves away from the mounting hole 12a when the frame portion 44 is mounted on the mount member 12. The claw portion 50 is formed to be bent into an arc-like shape when seen from a side thereof. The elastic locking portion 48 is formed so as to deflect on a second side 44b of the wall portion 42 that is at a lower end side thereof. Then, locking the claw portion 50 on the rear side portion 12c of the mount member 12 and locking the elastic locking portion 48 in the locking recess portion 12b of the mount member 12 prevent the base member 22 from being dislocated to the front side of the mount member 12.

The erect portion 52 is erected upwards from the first side 44a of the wall portion 42 at a root side of the claw portion 50. The erect portion 52 extends shorter than the claw portion 50 and is locked on the rear side portion 12c of the mount member 12 in a position that lies nearer to the mounting hole 12a than a distal end of the claw portion 50 when the frame member 44 is mounted on the mount member 12. Forming the erect portion 52 enables the claw portion 50 to be provided not only on the wall portion 42 but also on the erect portion 52, whereby the claw portion 50 can be made thicker to thereby enhance the rigidity thereof.

Returning to FIG. 2, the base member 22 and the bag hooking member 20 are assembled together integrally by inserting the shaft portions 26 of the bag hooking member 20 in the shaft hole portions 46 of the base member 22. The holding device 10 is mounted into the mounting hole 12a from the front side of the mount member 12 with the base member 22 and the bag hooking member 20 assembled together integrally. Specifically speaking, firstly, the claw portion 50 is passed through the mounting hole 12a, so that the claw portion 50 is brought into abutment with the rear side portion 12c. Then, the elastic portion 48 is rotated about the first side member 44a of the wall portion 42 and the erect portion 52 as a fulcrum to be pushed into the locking recess portion 12b, so that the elastic locking portion 48 is locked in place in the locking recess portion 12b, whereby the holding device 10 is mounted in the mounting hole 12a.

Figure 5:
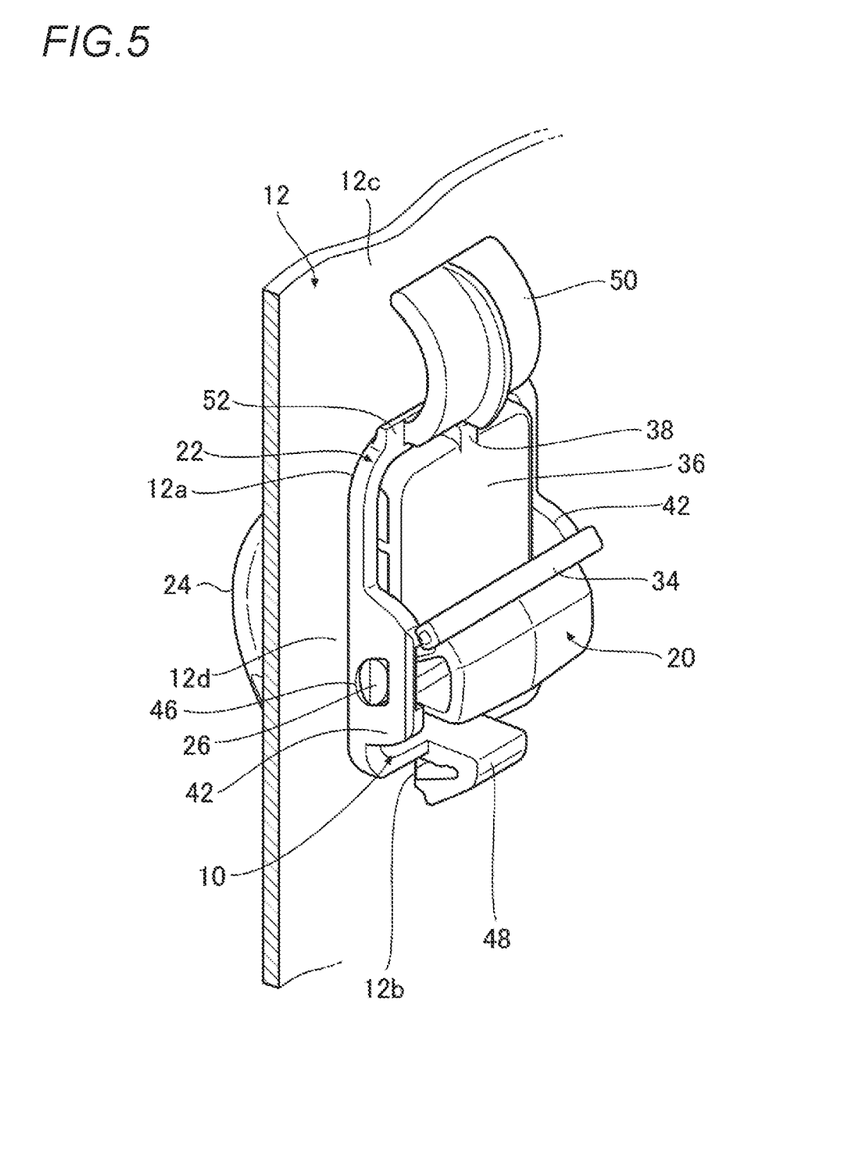
FIG. 5 is a rear perspective view of the holding device that is mounted in the mount member.

FIG. 5 is a rear perspective view of the holding device 10 that is mounted on the mount member 12. The bag hooking member 20 shown in FIG. 5 is in the protruding state. The distal end of the claw portion 50 is in abutment with the rear side portion 12c, and the elastic locking portion 48 is locked in the locking recess portion 12b, whereby the holding device 10 is prevented from being dislocated to the front side of the mount member 12. In addition, the erect portion 52 is locked on an edge of the mounting hole 12a to thereby restrict a great magnitude of load from acting on the claw portion 50. The abutment portion 38 projects towards a root of the claw portion 50 on a lower side of the claw portion 50 to thereby restrict the root of the claw portion 50 from being deformed.

Figure 6:
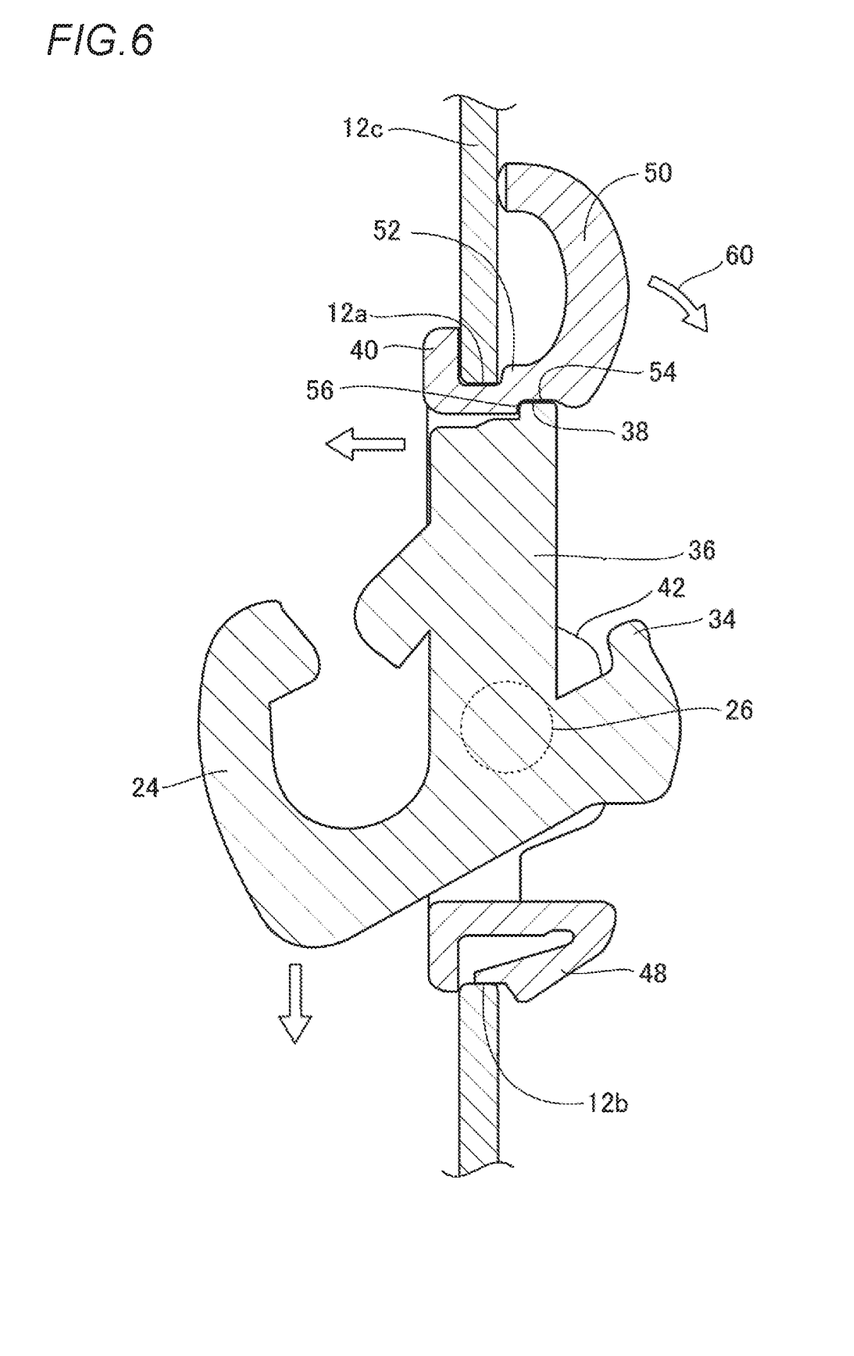
FIG. 6 is a sectional view of the holding device that is mounted in the mount member.
Figure 7:
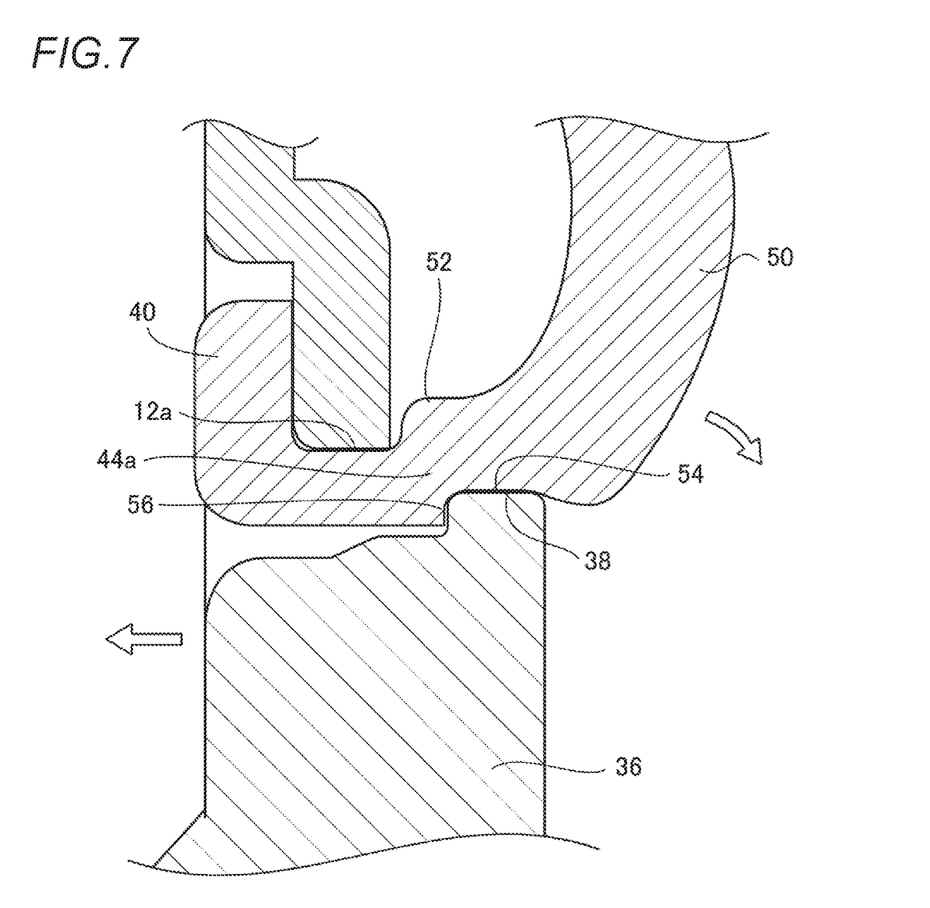
FIG. 7 is a partial sectional view of the holding device shown in FIG. 6.

FIG. 6 is a sectional view of the holding device 10 that is mounted on the mount member 12. FIG. 7 is a partial sectional view of the holding device 10 shown in FIG. 6. In the case where the predetermined member is hooked on the holding portion 24, a rotational moment is generated that acts about the shaft portions 26 as a center axis. Then, an upper end side of the base portion 36 attempts to rotate from the rear side towards the front side, and the abutment portion 38 strikes a frame edge 56 of the first side 44a, pushing in the first side 44a of the frame portion 44 from the rear side towards the front side. Namely, the rotational moment generated when the holding portion 24 holds the predetermined member is received on an upper side of a center of the frame portion 44, whereby a load is exerted on the claw portion 50.

When the frame portion 44 of the base member 22 receives a rotational moment in the opening direction from the bag hooking member 20, the claw portion 50 strikes the rear side portion 12c to receive a reaction force therefrom and then deflects in a direction 60 in which the claw portion 50 moves away from the mount member 12. As this occurs, the abutment portion 38 is brought into abutment with a root end face 54 of the claw portion 50 to thereby restrict the claw portion 50 from deflecting about the root of the claw portion 50 as a rotational fulcrum, thereby making it possible to suppress a deformation with time of the claw portion 50.

The claw portion 50 shown in FIG. 6 is brought into abutment with the rear side portion 12c of the mount member 12 to thereby deflect in the direction 60 in which the claw portion 50 moves away from the mount member 12, and a root portion of the claw portion 50 is deformed inwards of the frame portion 44 (downwards in FIG. 6). This causes the root portion of the claw portion 50 to interfere with the rotation of the abutment portion 38. Specifically speaking, as the bag hooking member 20 rotates in the opening direction, the abutment portion 38 approaches and then strikes the claw portion 50, sliding on the claw portion 50. Then, the abutment portion 38 is pushed into a lower side of the claw portion 50 in such a way as to be pressed thereinto to thereby be brought into abutment with the root end face 54 of the claw portion 50 in the protruding state. This causes the abutment portion 38 to strike the claw portion 50 in an ensured fashion, thereby making it possible to suppress deformation of the claw portion 50 that moves in the direction 60 in which the claw portion 50 moves away from the mount member 12. Additionally, a user can feel a sensation of operating the holding device 10 as a result of the abutment portion 38 sliding on the root end face 54.

When a great magnitude of load, for example, a load of a predetermined value or greater is applied to the holding portion 24 in the protruding state, the abutment portion 38 is brought into the frame edge 56 of the frame portion 44. Namely, when the predetermined member is not hooked on the holding portion 24, the abutment portion 38 lies near to the frame edge 56, while when the predetermined member having the load of the predetermined value or greater is hooked on the holding portion 24, the abutment portion 38 is brought into abutment with the frame edge 56. This enables the abutment portion 38 to also function as a stopper for stopping the rotation of the bag hooking member 20.

Figure 8:
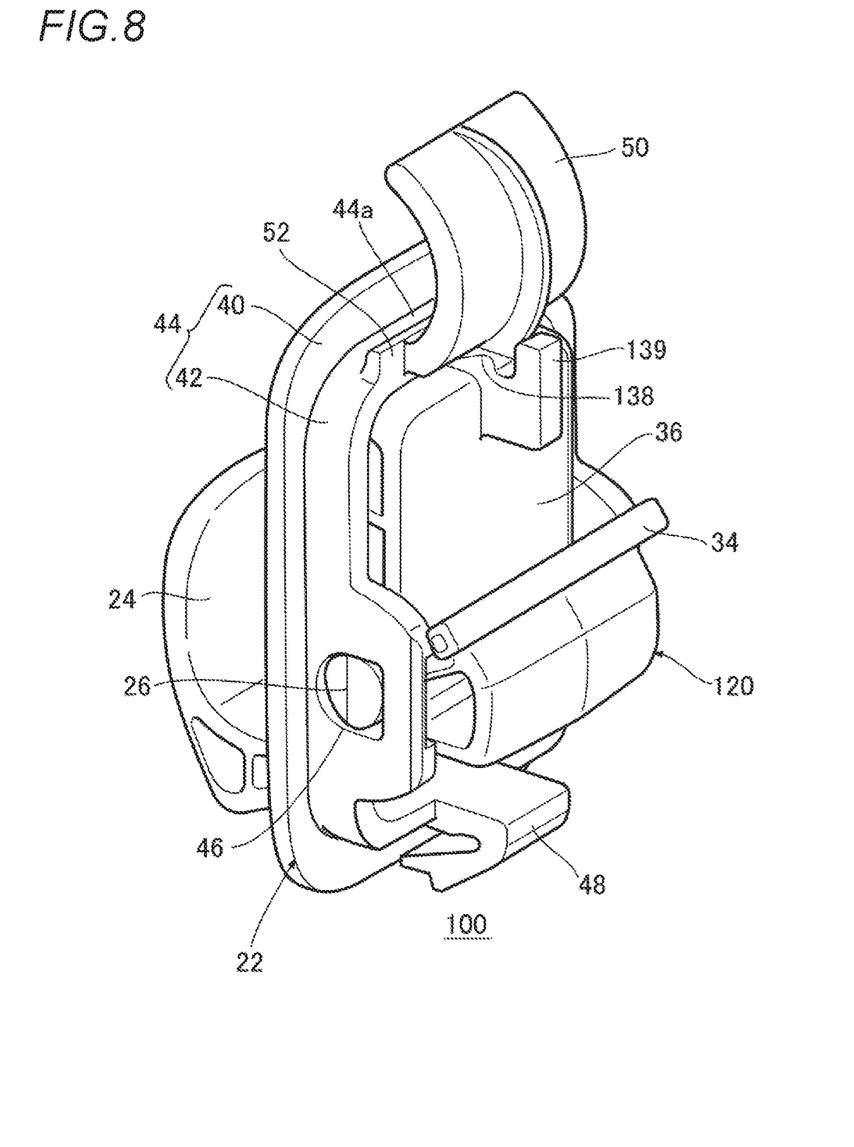
FIG. 8 is a perspective view of a holding device of a modified example.
Figure 9:
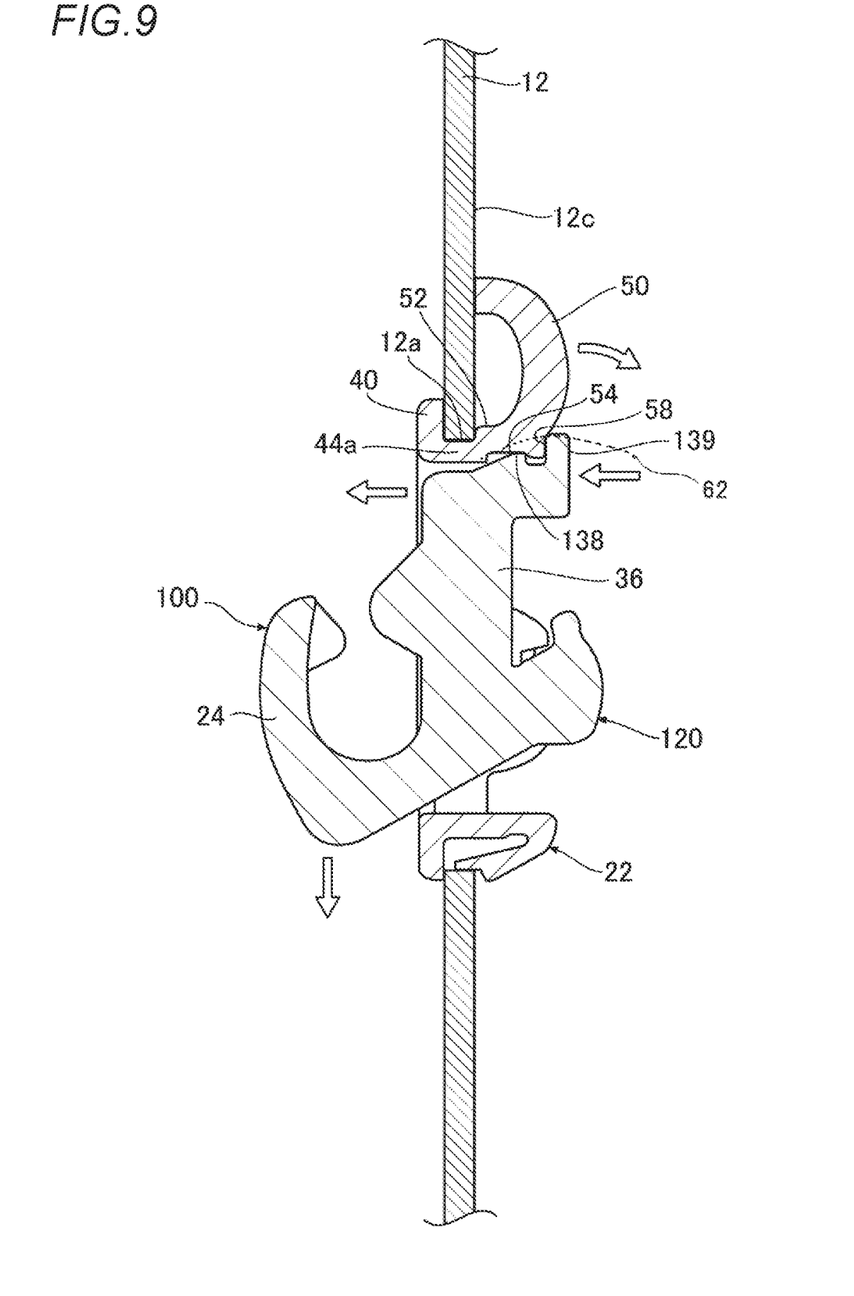
FIG. 9 is a sectional view of the holding device of the modified example that is mounted in a mount member.

FIG. 8 is a perspective view of a holding device 100 of a modified example. FIG. 9 is a sectional view of the holding device 100 of the modified example that is mounted on a mount member 12. The holding device 100 of the modified example differs in the shape of a bag hooking member 120 from the holding device 10 shown in FIG. 5.

The bag hooking member 120 has an abutment portion 138 that is formed on a base portion 36 and a pushing portion 139. The abutment portion 138 projects upward from an upper end face of the base portion 36 in a protruding state. The pushing portion 139 projects upwards from a rear surface of the base portion 36 in the protruding state and is formed into an L-shape when seen from a side. The pushing portion 139 projects upwards from a first side 44a of a wall portion 42 in the protruding state.

In the protruding state, the abutment portion 138 is brought into abutment with a root end face 54 of a claw portion 50 to restrict the claw portion 50 from deflecting, whereby a deformation with time of the claw portion 50 is suppressed. The abutment portion 138 is designed to interfere with the claw portion 50, and when the bag hooking member 120 is rotated, the abutment portion 138 slides on the root end face 54 and is then brought into abutment with the root end face 54.

The pushing portion 139 pushes a rear surface 58 of the claw portion 50 by virtue of a rotational moment of the bag hooking member 120 that is generated when a predetermined member is held on a holding portion 24, so that the claw portion 50 is forced to strike a rear side portion 12c of a mount member 12. This can restrict the claw portion 50 from being deformed by using a load of the predetermined member held by the holding portion 24. In addition, the pushing portion 139 strikes the rear surface 58 of the claw portion 50, enabling the pushing portion 139 to function as a stopper for stopping a rotation of the claw portion 50 in an opening direction.

When looking at the holding device 100 in a direction that is at right angles to a rear surface of the mount member 12 from a rear side thereof in a protruding state as shown in FIG. 8, the pushing portion 139 covers at least a part of the claw portion 50. Namely, the claw portion 50 is positioned on a rotational locus 62 of the pushing portion 139 in such a way as to overlap it, and the pushing portion 139 comes to strike the claw portion 50 when the bag hooking member 120 rotates in the opening direction. This enables the pushing portion 139 to forcibly strike the rear surface 58 of the claw portion 50 when the bag hooking member 20 rotates in the opening direction.

The invention is not limited to the embodiment and its modified example, and hence, modifications including various design changes can be made to the embodiment and the modified example based on the knowledge of those skilled in the art to which the invention pertains. The resulting embodiments to which those modifications are made can also be included in the scope of the invention.

While the mode in which the erect portion 52 is provided on the first side 44a of the wall portion 42 is described in the embodiment, an additional erect portion may be provided further on a lateral side of the wall portion 42. For example, the additional erect portion is formed on the wall portion 42 in a position lying near to a shaft hole portion 46 so as to project therefrom to be hooked on a rear edge of the mounting hole 12a in a mounted state. This configuration can disperse a load exerted on the claw portion 50 when a great magnitude of load is exerted on the bag hooking member 20.

What is claimed is:

1. A holding device mounted in a mounting hole in a mount member and configured to hold a predetermined member, the holding device comprising:
   a base member configured to be mounted in the mounting hole; and
   a bag hooking member that is supported rotatably on the base member,
   wherein the bag hooking member includes a holding portion that takes, depending on its rotational positions, a protruding state where the holding portion protrudes to a front side and a stowed state where the holding portion is stowed in on a rear side of the base member and that holds the predetermined member in the protruding state,
   wherein the base member includes:
      a frame portion configured to surround the bag hooking member;
      a claw portion that extends from one side of the frame portion to be locked on a rear side portion of the mount member; and
      an erect portion that is erected from the one side of the frame portion, in which the claw portion extends, to be locked on the rear side portion of the mount member in a position lying nearer to the mounting hole than a distal end of the claw portion, and
   wherein the base member includes an elastic locking portion that is formed at an other side of the frame portion which is opposite to the one side from which the claw portion extends and the erect portion is erected, the elastic locking portion being configured to be locked on the rear side portion of the mount member.

2. The holding device according to claim 1, wherein the bag hooking member includes an abutment portion that slides on the claw portion as the bag hooking member shifts rotationally from the stowed state to the protruding state and that is brought into abutment with the claw portion in the protruding state.

3. The holding device according to claim 2, wherein the abutment portion is configured to be brought into abutment with the frame portion in the protruding state.

4. The holding device according to claim 1, wherein the bag hooking member includes a pushing portion that forces the claw portion to strike the rear side portion of the mount member by virtue of a rotational moment of the bag hooking member that is generated when the predetermined member is held on the holding portion.

5. The holding device according to claim 4, wherein the pushing portion covers at least a part of the claw portion when seen in a direction that is at right angles to a rear surface of the mount member from a rear side thereof in the protruding state, and
   wherein the claw portion is positioned on a rotational locus of the pushing portion that is defined when the bag hooking member shifts rotationally from the stowed state to the protruding state so as to overlap the rotational locus.

6. A holding device mounted in a mounting hole in a mount member and configured to hold a predetermined member, holding device comprising:
   a base member configured to be mounted in the mounting hole; and
   a bag hooking member that is supported rotatably on the base member,
   wherein the bag hooking member includes a holding portion that takes, depending on its rotational positions, a protruding state where the holding portion protrudes to a front side and a stowed state where the holding portion is stowed in on a rear side of the base member and that holds the predetermined member in the protruding state,
   wherein the base member includes:
      a frame portion configured to surround the bag hooking member; and
      a claw portion that extends from the frame portion to be locked on a rear side portion of the mount member,
   wherein the bag hooking member includes a pushing portion that pushes the claw portion against the rear side portion of the mount member by virtue of a rotational moment of the bag hooking member that is generated when the predetermined member is held on the holding portion,
   wherein, in the protruding state, the pushing portion covers at least a part of the claw portion when seen in a direction that is at right angles to a rear surface of the mount member from a rear side thereof, and
   wherein the claw portion is positioned on a rotational locus of the pushing portion that is defined when the hag hooking member shifts rotationally from the stowed state to the protruding state so as to overlap the rotational locus.

7. The holding device according to claim 1, wherein the erect portion extends shorter than the claw portion.

8. The holding device according to claim 1, wherein the erect portion is formed at a root side of the claw portion.

9. A holding device mounted in a mounting hole in a mount member and configured to hold a predetermined member, the holding device comprising:
   a base member configured to be mounted in the mounting hole; and
   a bag hooking member that is supported rotatably on the base member,
   wherein the bag hooking member includes a holding portion that takes, depending on its rotational positions, a protruding state where the holding portion protrudes to a front side and a stowed state where the holding portion is stowed in on a rear side of the base member and that holds the predetermined member in the protruding state,
   wherein the base member includes:
      a frame portion configured to surround the bag hooking member;
      a claw portion that extends from one side of the frame portion to be locked on a rear side portion of the mount member; and
      an erect portion that is erected from the one side of the frame portion to be locked on the rear side portion of the mount member in a position lying nearer to the mounting hole than a distal end of the claw portion, and
   wherein the bag hooking member includes an abutment portion that slides on the claw portion as the bag hooking member shifts rotationally from the stowed state to the protruding state and that is brought into abutment with the claw portion in the protruding state.

10. The holding device according to claim 1, wherein the hag hooking member includes an abutment portion that slides on the claw portion as the bag hooking member shifts rotationally from the stowed state to the protruding state.

11. The holding device according to claim 10, wherein the abutment portion is configured to be brought into abutment with the frame portion in the protruding state.

12. The holding device according to claim 1, wherein the bag hooking member includes an abutment portion that is brought into abutment with the claw portion in the protruding state.

13. The holding device according to claim 12, wherein the abutment portion is configured to be brought into abutment with the frame portion in the protruding state.

14. The holding device according to claim 1, wherein the bag hooking member includes a pushing portion that forces the claw portion to strike the rear side portion of the mount member by virtue of a rotational moment of the bag hooking member that is generated when the predetermined member is held on the holding portion, and wherein the pushing portion covers at least a part of the claw portion when seen in a direction that is at right angles to a rear surface of the mount member from a rear side thereof in the protruding state.

15. The holding device according to claim 1, wherein the hag hooking member includes a pushing portion that forces the claw portion to strike the rear side portion of the mount member by virtue of a rotational moment of the bag hooking member that is generated when the predetermined member is held on the holding portion, and wherein the claw portion is positioned on a rotational locus of the pushing portion that is defined when the hag hooking member shifts rotationally from the stowed state to the protruding state so as to overlap the rotational locus.

\* \* \* \* \*